(12) United States Patent
Halahmi et al.

(10) Patent No.: US 6,282,623 B1
(45) Date of Patent: *Aug. 28, 2001

(54) METHOD FOR DIGITAL SIGNAL PROCESSING, DSP, MOBILE COMMUNICATION AND AUDI O-DEVICE

(75) Inventors: Dror Halahmi, Tel Aviv; Yoram Salant, Rosh-Haain, both of (IL)

(73) Assignee: Motorola Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,986

(22) Filed: Feb. 4, 2000

(51) Int. Cl.[7] ........................................ G06F 12/00
(52) U.S. Cl. .............................. 711/201; 711/165
(58) Field of Search ....................... 711/201, 165

(56) References Cited

U.S. PATENT DOCUMENTS 4,609,996    9/1986  Kummer .
5,805,877  * 9/1998  Black et al. ..................... 712/239

OTHER PUBLICATIONS

Motorola Semiconductor Technical Data, Advance Information DSP56301, p. 01, Motorola Inc., 1995.

* cited by examiner

Primary Examiner—Jack A Lane
(74) Attorney, Agent, or Firm—Joanna G. Chiu

(57) ABSTRACT

Embodiments of the present invention relate generally to digital signal processing. One embodiment contemplates a method for performing a digital signal processing operation having a first data word located at a misaligned starting address within a first memory. The method includes outputting the first data word to a register file during a first internal. During a second interval, the method further includes reading a second data word and a third data word from the first memory where the second data word is output to the register file and the third data word is output to the first buffer. Embodiments also contemplate a digital signal processor having a register filed capable of receiving one data word from a memory and one data word from a buffer during each of a series of processing intervals for performing a digital signal operation.

22 Claims, 2 Drawing Sheets

METHOD FOR DIGITAL SIGNAL PROCESSING, DSP, MOBILE COMMUNICATION AND AUDI O-DEVICE

FIELD OF INVENTION

This invention relates generally to a field of digital signal processing, and more particularly to digital signal processing operations requiring memory access to consecutive data words.

BACKGROUND OF THE INVENTION

In the digital signal processing technology typically one or more analog signals which are representative of some real physical property are filtered or undergo some other kind of arithmetic evaluation or transformation. For this purpose, it is necessary to sample the incoming analog signals. For each analog signal this results in a continuous stream of digital samples. Furthermore, it is known in the art to store such separate sequences of digital samples separately from each other in different memories or in the same memory but separated address spaces. An example for micro processors which incorporate these principles is the DSP 56300 family of 24-bit digital signal processors which are commercially available from Motorola, Inc.

Digital signal processors are applied in virtually all fields of technology and apparatuses. One application is to replace the functionality of an analog device, such as an analog filter, by a digital filter which allows for an enhanced quality and more compact design. Other fields are for digital audio devices, such as compact disc players or digital audio tapes, as well as communication devices, such as mobile telephones or radios. Such applications typically require a high processor throughput, either because of the high band width of the sample's analog signal or because of the complexity of the digital transformations to be carried out on the sampled signal or a combination of both.

A need therefore exists to increase the performance of digital signal processors.

SUMMARY OF THE INVENTION

The underlying problem of the invention is substantially met by applying the features laid down in the independent claims. Preferred embodiments are given in the dependent claims.

The invention is advantageous in that it allows to significantly improve the processing performance of a digital signal processor by adding only minimal hardware.

According to a preferred embodiment of the invention, four data accesses can be carried out in a single processing cycle. The corresponding data sequences can be processed in a finite impulse response type processing step which typically involves data processing in multiply-accumulate loops. Preferably two multiplication units are used, each of which can multiply two of the data words provided in each cycle. The results of the two multiplications is added and accumulated.

If the architecture of a digital signal processor designed in accordance with the principles of the invention is pipelined, this allows two multiply-accumulate operations in one cycle without increasing the clock frequency. As a consequence, such a digital signal processor is also advantageous with respect to power dissipation. This is particularly beneficial for battery powered applications, since the minimized power dissipation of the digital signal processor allows longer intervals between recharging the battery.

Furthermore, it is particularly advantageous that only a single address generation unit is required even though at least two data words can be accessed from each memory device or address region in a memory device. Thus, by using only a single address generation unit, up to four data words can be accessed in a single cycle.

DETAILED DESCRIPTION OF THE PREFERRED EMBODIMENTS

Figure 1:
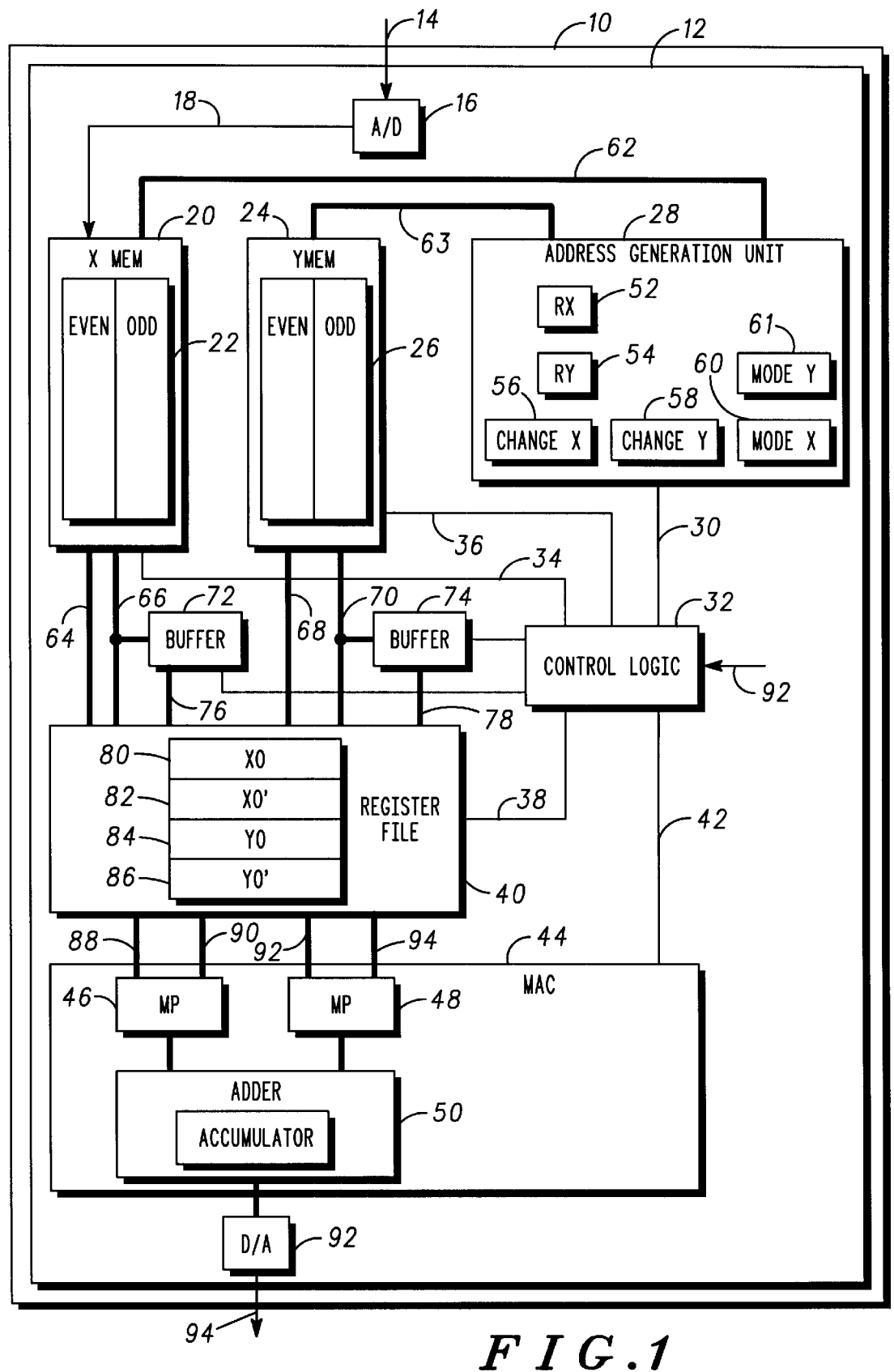
FIG. 1 is a schematic block diagram of a first embodiment of a digital device including a digital signal processor designed in accordance with the principles of the invention.

With reference to FIG.1 a digital device 10 which incorporates a digital signal processor 12 is explained in detail. The digital device 10 can be for example and not intended to be limiting a digital audio device, such as a compact disc player, or a digital communication device, such as a mobile telephone or radio.

In the later case typically an analog signal is received from an antenna of the digital device 10. Such a signal is shown as signal 14 in FIG. 1. The signal is fed into analog-digital converter 16. The samples of the signal 14 delivered by the analog-digital converter 16 are inputted via data line 18 into a memory 20. The memory 20 has a storage array 22. The sampled data words which are inputted via data line 18 to the memory 20 are stored in the address space of the storage array 22 in consecutive order. This means that the first data word, which is inputted into the storage array 22, is stored at the lowest order address and that consecutive further data words are stored at increasing addresses. Other address schemes are also possible such as starting with the highest address and filling up the storage array 22 at consecutive storage locations of decreasing addresses.

The address space of the storage array 22 is logically divided into even and odd addresses. The same applies analogously for memory 24 which has a storage array 26. The memory 24 can serve to store data words which are representative of samples of another input signal or of filter coefficients to be used in the digital signal processing of the signal 14.

In the case of a digital audio device, such as a compact disc player, the signal 14 provided by the laser beam which scans the rotating compact disc is already digital information so that no analog-digital converter 16 is required. Instead the signal 14 is directly inputted into memory 20 without a need for analog to digital conversion.

For the addressing of the memories 20 and 24, the digital signal processor 12 has address generation unit 28 which is coupled via control line 30 to control logic 32. The control logic 32 is also coupled via the control lines 34 and 36 to the memories 20 and 24, respectively. Control line 38 couples the control logic 32 to register file 40 whereas control line 42 couples the control logic 32 to a multiply accumulator 44. The multiply accumulator 44 has multipliers 46 and 48 having their outputs connected to an adder-accumulator 50.

The address generation unit 28 has a register 52 for storage of an address for the memory 20 and a register 54 for storage of an address for the memory 24. Further the address generation unit 28 has registers 56 and 58 to specify the amount of change required for the addresses stored in register 52 and 54, respectively, for the next processing interval. In registers 60 and 61 the mode in which the address generation unit 28 operates is specified.

The address generation unit 28 is connected by address buses 62 and 63 to the memories 20 and 24, respectively. Both of the memories 20 and 24 have two data busses for outputting data: memory 20 is connected by data busses 64 and 66 to the register file 40 whereas memory 24 is connected by data busses 68 and 70 to the register file 40. The data busses 66 and 70 are also coupled to buffers 72 and 74, respectively. The buffers 72 and 74 are connected to the register file 40 by the data busses 76 and 78.

The register file 40 has registers 80, 82, 84 and 86. Each of theses registers can store one data word. The registers 80 and 82 are coupled via data lines 88 and 90 to the multiplier 46. Likewise the registers 84 and 86 are coupled via data lines 92 and 94 to the multiplier 48.

The result of a digital signal processing operation is outputted by adder 50 to digital-analog converter 92. The resulting analog signal 94 is the result of the digital signal processing operation carried out on the signal 14.

In operation the control logic 32 controls the processing of the incoming signal 14 according to the required digital signal processing operation.

In order to initialize the required digital signal processing operation the start addresses for both the memory 20 and the memory 24 have to be specified. For simplicity, the memory 20 and 24 will be referred to as X MEM and Y MEM, respectively, whereas the registers 52 and 54 will be referred to as RX and RY, respectively. The registers 80, 82, 84, and 86 of the register file 40 will be referred to as X0, X0', Y0 and Y0', respectively.

The start address for the required data sequence to be outputted from the X MEM is programmed in the register RX by the control logic 32 via control line 30. The start address for the required data sequence from the Y MEM is programmed in the register RY also by means of the control logic 32 via control line 30.

The control logic 32 checks the start address stored in the RX whether it is an even or an odd address. If the start address for the X MEM is even, the parameter CHANGE X which is stored in the register 56 is set to a value of 2—provided that the addressing mode is incremental.

If the start address for the X MEM is odd, the value of the parameter CHANGE X is set to be equal to the value 1 by the control logic 32 via control line 30—again provided that the addressing mode is incremental. The same check is carried out for the start address stored in the RY. If the start address for the Y MEM is even, the parameter CHANGE Y stored in the register 58 is set to be equal to the value of 2; if the start address for the Y MEM is odd, the value of CHANGE Y is set to be equal to the value of 1—analogous to the process carried out for the start address for the X MEM.

The parameters MODE X and MODE Y are stored in the registers 60 and 61, respectively. The parameters MODE X and MODE Y specify the addressing mode for the X MEM and the Y MEM, respectively. If, for example, the value of MODE X is equal to 0, this means that the data words are to be outputted from the X MEM in increasing address order, so that after each iteration the address stored in the RX is incremented by the value specified by the parameter CHANGE X. Likewise, if the value of MODE X is logically 1, this means that the address stored in X is decremented after each processing interval by the value as specified by CHANGE X. The same applies analogously to the setting of the parameter MODE Y in the register 61. Both parameters MODE X and MODE Y are set via the control line 30 by the control logic 32.

Thus, during an initialization interval the start addresses for the sequence of data words to be outputted from X MEM and Y MEM are programmed in the registers RX and RY, respectively, as well as the corresponding parameters CHANGE X, CHANGE Y, MODE X and MODE Y.

If, for example, the start address for the X MEM is even and MODE X equals logically 0 (incrementing address mode), the data word which comes next after the data word having the start address stored in RX has an address which is incremented by 1 with respect to the first data word in the sequence. As a consequence, the second data word in the X MEM sequence has an address which is odd and thus differs only in its least significant bit from the start address stored in RX. Since both address words are required for the processing, it is signaled to the X MEM via control line 34 to output both the data word stored on the start address stored in RX and the consecutive data word being stored on the address next to the start address which differs only in its least significant bit in response to the reception of an address via the address bus 62. In other words: If the control line 34 is raised, the least significant bit line of the address bus 62 becomes a "Don't care" bit, since both data words having an address matching all the higher order address bits will be outputted by the X MEM. As a consequence two data words are outputted from X MEM during one initialization interval, so that for the next interval the address has to be increased by 2 in order to output the consecutive two data words of the required sequence from the X MEM.

If the start address RX is odd and the address mode X is logically 0 (incrementing address mode), this means that there is no data word in the required output sequence which has an address that differs only in its least significant bit from the start address of the sequence stored in RX. As a consequence, the control line 34 is dropped by the control logic 32 to logically 0, so that the X MEM only outputs the data word being stored on exactly the start address stored in RX, but no other data word. Since only one data word is outputted in this alternative first initialization interval, the value of CHANGE X is set to be equal 1, so that for the next initialization interval the value of the address stored in RX is incremented only by 1. After this increment operation has been carried out, the address stored in RX no longer is odd, but even. As a consequence the control line 34 is raised, so that in response to the reception of the even address stored in RX via the address bus 62 again the least significant address bit becomes a "Don't care" bit position, so that the X MEM outputs two data words at a time in the alternative second initialization interval. As a consequence in this alternative case two initialization intervals are required as opposed to the first case considered here in which only one initialization interval is required before the main processing loop can be entered.

Whether the first or the second case is present can be determined according to the following table

|  | LSB | MODE |
| --- | --- | --- |
| CASE 1 | 0 | incremental (+) |
|  | 1 | decremental (−) |

-continued

|        | LSB | MODE           |
|--------|-----|----------------|
| CASE 2 | 0   | decremental (−)|
|        | 1   | incremental (+)| where the column LSB stands for the least significant bit of the address stored in RX and MODE for the addressing mode.

The logic of the above table can advantageously be implemented within control logic 32 by a XOR gate which is not shown in the drawing. If one input terminal of the XOR gate receives the logical value of the parameter MODE X and the other input terminal receives the least significant bit of the address which is stored in the RX, the resulting output of the XOR gate is logically 1 to indicate the first case and logically 0 in the second case.

Thus, the output of such a XOR gate within control logic 32 can serve to determine which of the two cases mentioned above is present.

The same applies analogously for the Y MEM and the corresponding programming of the address generation unit and issuing of control signals via control line 36 to the Y depending on whether the least significant bit of the address bus 63 is relevant or "Don't care". Also the control logic 32 can comprise an additional XOR gate which has MODE Y and the least significant address bit of the address stored in RY as input signals. Again the output of this additional XOR gate is 1 in the first case and 0 in the second case as described above.

If the first case is present, for both the X MEM and the Y MEM the total time period required for the initialization is just one initialization interval. If either for the X MEM or the Y MEM or for both the second case is present, an additional initialization interval is required as described above.

If the first case is present for the X MEM, the two data words which are outputted from X MEM in the same initialization interval are transferred via the data busses 64 and 66, respectively, to the registers X0 and X0'. If the same applies for the Y MEM, correspondingly two output data words are transferred via the data busses 68 and 70 and stored in the registers Y0 and Y0'.

If, however, the case 2 is present for the Y MEM, only one data word is outputted in the first initialization interval from Y MEM. In the consecutive second initialization interval two data words are outputted only one of which is to be stored in the register file 40. The other output data word is intercepted in the buffer 74 by control logic 32. The same applies analogously if the second case is present for the X MEM, so that one of the data words which are outputted in the second initialization interval is intercepted by buffer 72 which is also controlled by the control logic 32.

After the initialization phase is completed, each register X0, X0', Y0, Y0' of the register file 40 carries one data word. Now the operation of the multiply accumulator 44 can start in the main processing loop. In the main processing loop the required digital signal processing operation is carried out by means of the multiplier accumulator 44. Typically, such digital signal processing operations are finite impulse response signal processing operations. When the main processing loop starts in the first processing interval, the data stored in registers X0 and X0' is transferred via the data lines 88 and 90 respectively, to the multiplier 46. Likewise the data stored in registers Y0 and Y0' are transferred via the data lines 92 and 94, respectively, to the multiplier 48. The output of the respective multiplications is transferred to adder-accumulator 50 in which the two outputs of the multipliers 46 and 48 as well as the value stored in the accumulator are added and stored back into the accumulator. The presence of two multipliers 46 and 48 has the advantage that two multiplications can be carried out within the same time interval. After the completion of such two parallel multiplications another set of four data words is required to be transferred to the multipliers 46 and 48. This is accomplished by the control logic 32:

If the case 1 was present in the initialization interval, each output operation of two data words results in an increase of the addressed store in RX by 2, so that in the consecutive time interval the consecutive two data words of the required sequence are outputted and stored in the appropriate registers of register file 40. If, however, the case 2 was present during the initialization interval, one of the required data words is already present in the buffer 72 or 74—depending on whether the second case was present for the X MEM or the Y MEM. Carrying out the next processing cycle in the main loop, the data word stored in the buffer 72 or 74 is transferred to the register file 40 to be stored in the appropriate register. Also after the completion of the initialization interval in the second case, the value of CHANGE X or CHANGE Y has been set to 2, so that the value of the address stored in RX or RY is changed by 2 after each output operation. As a consequence one of the data words of the pair of data words outputted by the corresponding memory is transferred to the register file 40 and the other one stored as a replacement in the buffer 72 or 74 depending on which one of the memories X MEM or Y MEM the second case applies. Therefore, also in the second case one multiplication and accumulation operation can be carried out in the main processing loop with four operands due to this pipelined structure.

As a result the throughput of the digital signal processor 12 is doubled as compared to a prior art signal processor having just one multiplication unit. This is accomplished by adding only a minimal number of hardware elements.

In the following, a digital processing operation according to formula (1)

$$a = \sum_{i=0...5; j=1...6} (x[i] \cdot y[j]), \quad (1)$$

is described by way of example, where x [i] refers to the data word stored in the X MEM on the address i and y [j] refers to data word stored in Y MEM on the address j. According to the formula (1), a total of six multiplications and summations has to be carried out in order to calculate the value of a. In order to prepare the execution of the digital signal processing operation according to formula (1) the digital signal processor 12 has to be initialized by the control logic 32. For this purpose the control logic 32 receives input commands from a user or from a program control at its input 92. By the instruction (i1)

$$\text{move\#0, RX} \quad (\text{i1})$$

the address i=0 is moved to the register RX as a start address for the sequence of data words to be outputted from X MEM. Likewise the instruction (i2)

$$\text{move\#1, RY} \quad (\text{i2})$$

causes the control logic 32 to move the address 1 into the register RY as a start address of the sequence of data words to be outputted from Y MEM. The instruction (i3)

$$\text{clr a} \quad (\text{i3})$$

causes the control logic 32 to issue a control signal via control line 42 to clear the value a, which is stored in the accumulator of the adder-accumulator 50. Next the instruction (i4)

move 2x:(RX)+, X0, y:(RY)+, Y0    (i4)

is received by the control logic 32 at its input 92. This instruction means that the data word being stored on the address of the register RX is to be moved from the X MEM to the register X0. Further, as it is indicated by (RX)+ the addressing mode is incrementing, so that the parameter MODE X is set to logically 1. Further, the fact that X0 is part of the instruction (i4) indicates that the consecutive data word of the incremented starting address is to be moved to X0'. The same applies analogously for the part y: (RY)+, Y0 of the instruction i4 which relates to the data words in the Y MEM.

As the start address for the sequence of data words to be outputted from X MEM in the register RX is even, the case 1 is present for X MEM, so that the least significant bits of the addresses outputted by address generation unit 28 via the address bus 62 is "Don't care". As a consequence—as described above in more detail—the two data words x[0] and x[1] are outputted concurrently from the X MEM via the data busses 64 and 66, respectively. The data word of the address 0 which is x[0] is stored in the register X0 and the data word of the consecutive incremented address 1 which is x[1] is stored in the register X0' under control of the control logic 32 via control line 38. This happens in the first initialization interval.

In parallel to the addressing, outputting and storing of the two first data words of the X MEM data sequence, the Y MEM is also accessed. Since the address stored in the register RY is 1, an odd address is the starting address of the Y MEM output sequence, so that the second case is present. This means that only the first data word of the Y MEM sequence can be addressed, outputted and stored in the register file during the first initialization interval because the least significant bit position of the address stored in RY is relevant.

After the data word Y[1] has been outputted from the Y MEM the parameter CHANGE Y stored in the register 58 is set to be equal 1, so that the address stored in RY is incremented by 1. As a consequence in the following second initialization interval the two consecutive data words y[2] and y[3] are outputted. The address word y[2] is stored in the register Y0' in the register file 40—the data word y[1] has already been stored in the previous first initialization interval in the register Y0 as specified by the instruction i(4). Since at this time the data word y[3] is not yet needed, it is stored in the buffer 74 for usage in a consecutive processing interval.

After the buffering of the data word y[3], the second initialization interval is completed, so that the main processing loop can be started. The parameter CHANGE Y will also be set two 2 because in the following always two data words are to be outputted at a time from Y MEM:

The main processing loop can be started by the control logic 32 after an instruction (i5)

mac2 X0, Y0, a X: (RX)+, X) Y:(Y)+, Y0    (i5)

has been received. According to the instruction i(5), the data words of the registers X0 and Y0 have to be multiplied and accumulated as well as the data words stored in registers X0' and Y0'. The corresponding multiplications are carried out by multipliers 46 and 48, and the accumulation by the adder-accumulator 50. Further, the instruction i(5) specifies that after each processing step the address stored in register RX has to be incremented by 2 as well as the address stored in xegister RY. This is made clear by the symbols (RX)+ and (RY)+, respectively, instruction i(5). Also it is specified that the first data word having the lower address is stored in the register X0 and Y0, respectively, and the higher order address data word in the registers X0' and Y0', respectively. If instead of the "+"-sign a "−"-sign would be present, this would have the opposite meaning.

When the instruction i(5) is carried out the first time by the multiply accumulator 44, the following over all calculation is performed:

$$a := a + x[0] * y[1] + x[1] * y[2]$$

This means that in one processing interval two consecutive data words of both the X and the Y MEM sequence are processed. Since at this stage both parameters CHANGE X and CHANGE Y have been set to be equal 2, in the next processing step the next pair of two data words of each sequence is processed—in other words:

$$a := a + x[2] * y[3] + x[3] * y[4].$$

After a further increase of both the addresses stored in RX and RY, the next processing interval already yields the final result for a:

$$a := a + x[4] * y[5] + x[5] * y[6].$$

Since the case 1 is present for the X MEM (the X start address is odd), all the data words from X MEM are directly transferred to the register file 40. As opposed to this, the data words y[3] and y[5] are sequentially buffered in the buffer 74 prior to their transfer to register file 40.

Figure 2:
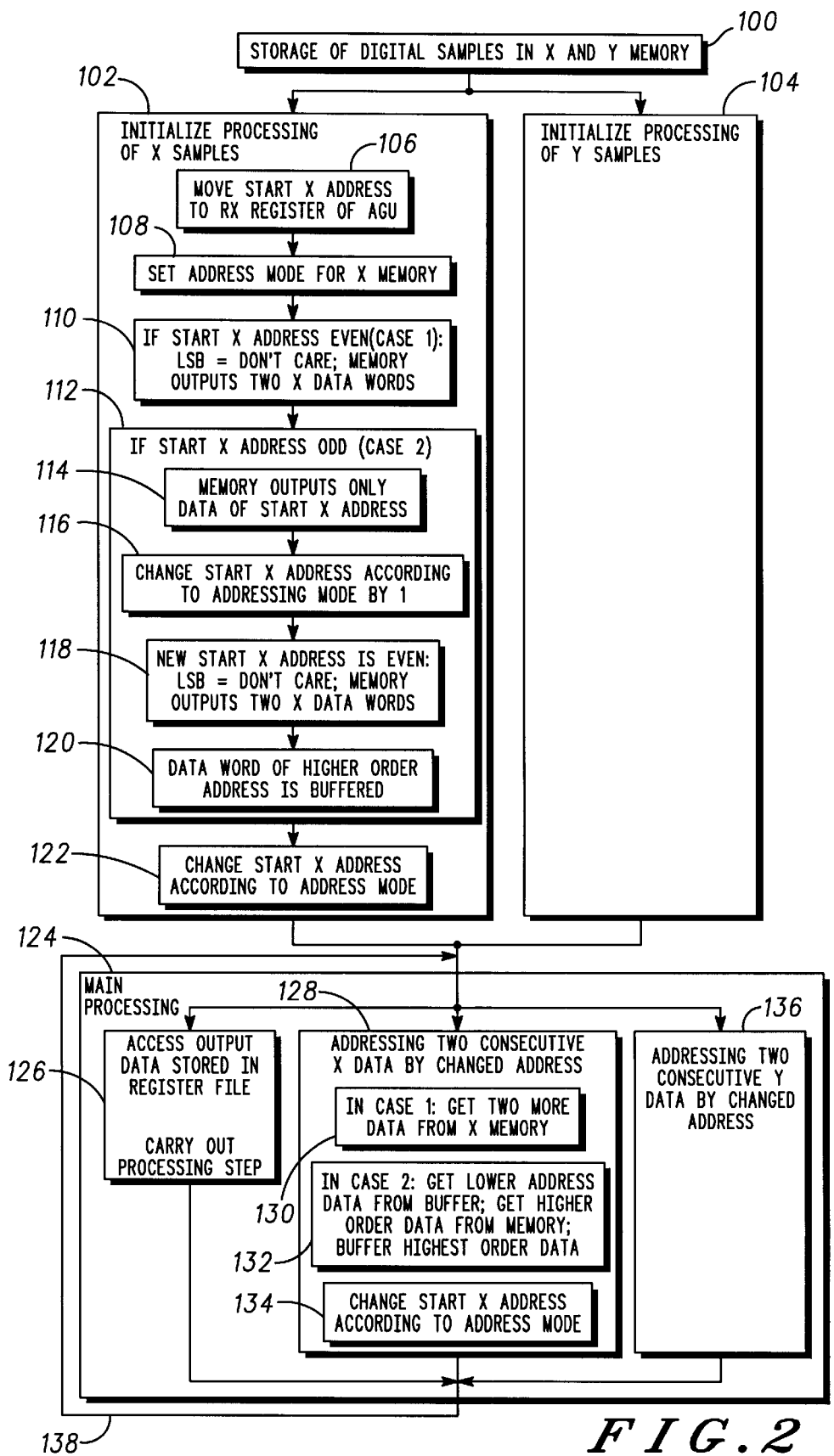
FIG. 2 is a flow diagram which illustrates one embodiment of the method of the invention.

In the following with reference to FIG. 2 one embodiment of the method of the invention is described in greater detail.:

In step 100 digital samples are stored in the X and Y Memory. In step 102 the processing of the samples stored in the X Memory is initialized; likewise the processing of the samples stored in the Y Memory is initialized in step 104. In the following the initialization processing is only explained in detail with respect to the samples stored in the X Memory, but not for the Y samples, since both processes carried out in step 102 and step 104 in parallel are analogous.

For the initialization first the start address of the sequence of data words to be outputted is moved into the register RX of the address generation unit (AGU). This is done in step 106. In step 108 the address mode for the X Memory is set to be either incrementing or decrementing depending on whether the output sequence starts on top or on the bottom of the address range.

In step 110 it is checked whether the start address of the sequence to be outputted from the X Memory is even. If the address stored in the RX register is even, this means that the least significant bit of this address is "Don't care". When the X Memory is accessed by an even start address in step 110, this results in an output of two data words from the X Memory having the same address bits except the least significant address bit.

If the start address stored in the register RX is odd, this means that case 2 is present, since at the same time the address mode is incrementing. This means that the least significant bit of the start address is relevant, so that only a data word of the start address stored in RX is outputted from the X Memory in step 114. In step 116 the address stored in RX is incremented by 1, so that an even address stored in RX results. As a consequence the least significant bit of the new address stored in RX becomes "Don't care". As a consequence in the next initialization step 118 the memory outputs the next two consecutive data words of the output sequence from the X Memory whereby the two data words have an address which differs only in the least significant bit from each other. Since the data word having the higher address is not yet required at this stage, it is buffered in step 120 for later use. In step 122 the address stored in the register RX is incremented by 2 according to the selected incrementing address mode irrespective of whether case 1 or case 2 is present.

After the initialization phase two data words from the output sequence of the X Memory as well as from the Y Memory are available for processing. As a consequence the main processing 124 is started. In step 126 the available X and Y Memory output data is accessed from the register file and processed according to the required digital signal processing operation. At the same time two consecutive data words in the required output sequence from the X Memory are addressed and outputted from the X Memory. If the case 1 is present, this is done in step 130 by getting two more data words from the X Memory whereby the two more data words have an address which differs only in its least significant bit.

If the case 2 is present the lower order address data word is fetched from the buffer and the higher order data word from X Memory, the further data word which is also outputted from the X Memory at the same time and which has an address which is incremented by 1 with respect to the higher order data word is buffered to replace the previous lower order address data word. This is done in step 132. In step 134, the address stored in the register RX is incremented by 2 again, according to the applicable addressing mode. The operations carried out in step 128 are carried out the same way for the Y Memory in step 136. Step 136 is carried out in parallel to the steps 126 and 128. After the steps 126, 128, and 136 have been carried out, a further iteration 138 of the main loop is initiated so that the step 124 is repeated for a number of times required to complete the digital signal processing operation as specified.

Typically the initialization intervals as well as the processing intervals referred to above are carried out in one machine cycle only. If a pipelined implementation is chosen, this means that in each machine cycle two accumulate-multiply operations can be carried out.

What is claimed is:

1. In a digital signal processor having a first memory, a first buffer, and a register file, a method for performing a digital signal processing operation having a first data word located at a misaligned starting address within the first memory, comprising:

outputting the first data word to the register file during a first interval;

during a second interval, reading a second data word and a third data word from the first memory, wherein the second data word is output to the register file and the third data word is output to the first buffer; and completing the digital signal processing operation.

2. The method of claim 1, further comprising:

during subsequent intervals, outputting to the register file two data words, wherein one of the two data words is read from the first buffer and the other one of the two data words is read from the first memory.

3. The method of claim 2, further comprising:

during the subsequent intervals, accessing two data words stored within the register file in order to perform the digital signnl operation.

4. The method of claim 2, wherein the digital signal processor comprises a second memory and a second buffer for providing another two data words to the register file.

5. The method of claim 4, further comprising accessing two pairs of data words stored within the register file during the subsequent intervals, wherein one of the two pairs corresponds to the first memory, and the other one of the two pairs corresponds to the second memory.

6. The method of claim 2, wherein the first and second intervals correspond to a first instruction and the subsequent intervals correspond to a second instruction.

7. The method of claim 1, further comprising:

during subsequent intervals, accessing from the first memory a next pair of data words, wherein one of the next pair of data words is stored into the first buffer, and the other one of the next pair is stored into the register file.

8. The method of claim 7, wherein the next pair of data words is a consecutive pair of data words.

9. The method of claim 7, further comprising:

during the subsequent intervals, outputting to the register file two data words, wherein one of the two data words is read from the first buffer and the other one of the two data words is read from te first memory.

10. The method of claim 9, wherein the two data words are consecutive data words.

11. The method of claim 9, further comprsing:

during the subsequent intervals, accessing two data words stored within te register file in order to perform the digital signal operation.

12. The method of claim 11, wherein the digital signal processor comprises a first multiplier and a first accumulator, and wherein the two data words accessed from the register file are output from the register file to the first multiplier for performing at least a portion of the digital signal processor operation.

13. The method of claim 7, wherein the first and second intervals correspond to a first instruction and the subsequent intervals correspond to a second instruction.

14. The method of claim 1, wherein the first memory includes even and odd addresses, and the misaligned starting address is an odd address.

15. A digital signal processor comprising:

an address generation unit;

a first memory coupled to the address generation unit;

a first buffer coupled to the first memory and capable of receiving data words from the first memory; and a register file coupled to the fist memory and the first buffer, and capable of receiving one data word from the first memory and one data word from the first buffer during each of a plurality of processing intervals for performing a digital signal operation.

16. The digital signal processor of claim 15, further comprising:

a second memory coupled to the address generation unit;

a second buffer coupled to the second memory and the register file, and capable of receiving data words from the second memory, wherein the register file is capable of receiving one data word from the second memory and one data word from the second buffer during each of the plurality of processing intervals.

17. The digital signal processor of claim 16, further comprising:
   a first multiplier coupled to the register file and capable of receiving from the register file two data words corresponding to the first memory and the first buffer, during one of the plurality of processing intervals; and
   a second multiplier coupled to the register file and capable of receiving from the register file two data words corresponding to te second memory and the second buffer during the one of the plurality of processing intervals.

18. The digital signal processor of claim 17, wherein the digital signal processor comprises only one address generation unit and is further characterized as being capable of performing two parallel multiplications on a set of four data words during a same time interval.

19. The digital signal processor of claim 16, wherein the first memory and the second memory each include:
   a storage array having even and odd addresses and capable of storing a plurality of consecutive data words.

20. The digital signal processor of claim 15, wherein the digital signal processor is capable of performing a fist initialization interval if a starting address of the digital signal operation is an odd address.

21. The digital signal processor of claim 20, wherein the first initialization interval stores a first data word into the register file, and a second initialization interval stores a second data word into the register file and a third data word into the first buffer.

22. The digital signal processor of claim 21, wherein the first and second initialization intervals occur prior to the plurality of processing intervals.

* * * * *